Feb. 26, 1952        J. P. JORDAN        2,587,331
HIGH-FREQUENCY ELECTRICAL HEATING METHOD AND APPARATUS
Filed Aug. 8, 1947
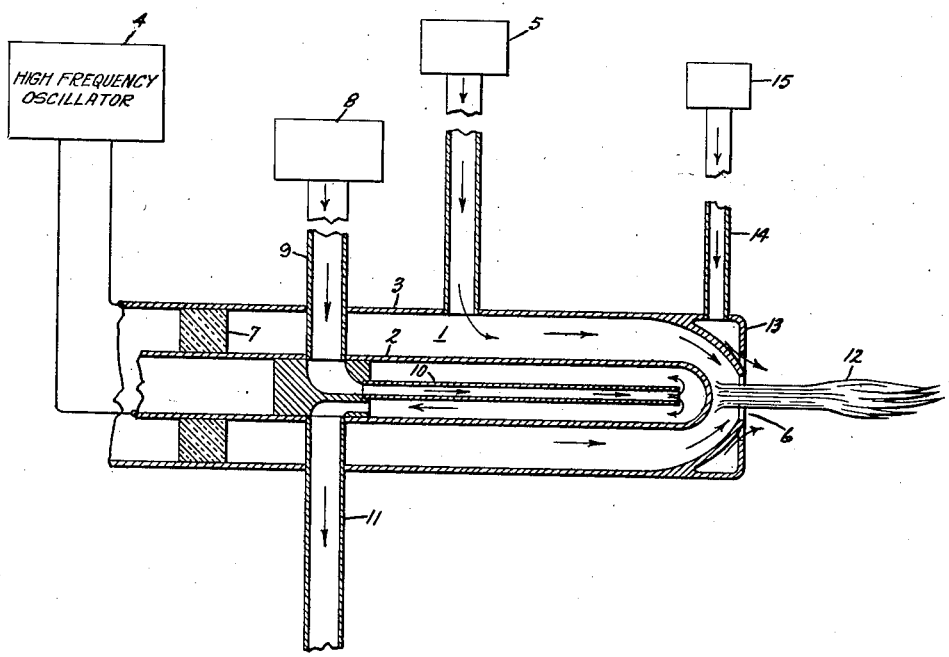
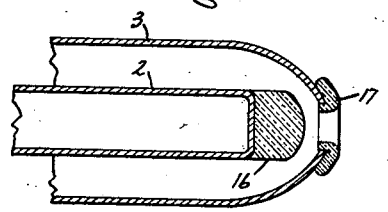
Inventor:
John Paul Jordan,
by Harry E. Dunham
His Attorney.

Patented Feb. 26, 1952

2,587,331

UNITED STATES PATENT OFFICE 2,587,331

HIGH-FREQUENCY ELECTRICAL HEATING METHOD AND APPARATUS

John Paul Jordan, Scotia, N. Y., assignor to General Electric Company, a corporation of New York Application August 8, 1947, Serial No. 767,384

4 Claims. (Cl. 219—14)

1

This invention comprises a method and apparatus for producing high temperatures by means of high frequency electrical discharges in gases which might find numerous practical usages, for example, in the general heating or welding arts. It is the general object of the invention to provide an improved method and apparatus for producing high temperatures characterized by numerous advantages such as simplicity in construction and operation, relative freedom of the gaseous discharge from contaminating effects of electrode materials, more facile generation of high temperatures in oxidizing atmospheres, and relatively high operational efficiency.

The features of the invention desired to be protected are set forth in the appended claims. The invention itself, together with further objects and advantages thereof, will best be understood from the following description when taken in connection with the accompanying drawing in which Fig. 1 illustrates a practical embodiment of the invention in a high frequency electrical heating device useful, for example, as a welding torch or like device; while Fig. 2 illustrates one modification of the device of Fig. 1.

Generally speaking, the objects of the invention are attained by generating a high frequency electrical discharge in a flowing gas and permitting the flow of gas to direct the thermally and electrically active portions of the discharge into a narrow flame-like column extending outwardly away from one of the high frequency terminals of the exciting apparatus. Heating of both terminals and, consequently, contamination of the discharge by metallic material of the terminal structure is minimized by this feature as well as by additional forced cooling when desired. Moreover, I have found that by these means it is possible to cause the flame-like column of the discharge to assume a well stabilized position whereby it may be readily and conveniently directed at and concentrated upon any object to be heated.

While the phenomena underlying the invention are not fully understood, nevertheless it is believed that they are explainable on the following basis. It appears that there may occur within the high frequency discharge two phenomena which give rise to a relatively high temperature. First, it appears that polyatomic gaseous molecules within the gaseous flow may be disassociated and broken down into their constituent atoms by the high frequency discharge. Subsequent recombination of the monotomic structures to reform the molecules may cause a certain amount of latent heat or energy of disassociation to be delivered up in the form of heat when the atomic particles recombine in the vicinity of or on the surface of the object to be heated. Secondly, a similar phenomenon appears to take place with respect to ionization of the gaseous particles. A certain amount of latent heat or energy is consumed in ionizing the particles of the gaseous discharge and this in turn is delivered up to the article to be heated in the form of heat when the gas becomes deionized at or near the surface of the object to be heated. Thus, if a gas be chosen which can be subjected to both phenomena, namely, disassociation and ionization, then it may be expected that a relatively large amount of heat will be exchanged in the process. Certain gases may utilize only the one phenomenon of disassociation to produce a usable amount of heat in the process while still others, namely, the monotomic gases having high ionization potentials, such as helium, may utilize only the ionization phenomenon and yet produce a useful amount of heat in the process. Thus, generally it is desirable to use a gas which normally has a molecular form and which can be disassociated by a high frequency discharge, or a gas which has a high ionization potential and can be ionized by a high frequency discharge, or a gas which has both characteristics.

Referring now to Fig. 1, the device there shown comprises generally any suitable means for producing a high frequency gaseous discharge, such as the concentric transmission line 1 comprising the inner and outer hollow cylindrical conductors 2 and 3 respectively energized by any suitable source of high frequency oscillations indicated by the oscillator 4 (e. g. a 1000 megacycle magnetron oscillator capable, for example, of generating about a five kilowatt output or at any other power output level depending on the amount of heat required for a particular use). Any suitable means for producing a flow of gas capable of directing the thermally active portions of a high frequency electrical discharge emanating from the tip of the conductor 2 into a flamelike column extending outwardly away from the tip of conductor 2 may be utilized. For example, I have shown source 5 which may be an air blower or a pressure chamber for other gases arranged to inject a flow of suitable gas into the interspace between the conductors 2 and 3 and cause it to flow out of a nozzle 6. The nozzle 6, as indicated, comprises simply an orifice in the otherwise closed end of the outer conductor 3, which orifice is positioned adjacent the closed end of the inner cylinder 2.

The inner cylinder 2 may be supported within the outer cylinder 3 by any suitable means, such as the insulating spacer 7. I have found it desirable to provide suitable cooling means in order further to minimize heating of the structure, especially the inner cylinder, and such means is shown as comprising the source 8 of a coolant, such as water, which directs the flow of coolant into the pipes 9 and 10 and circulates it through the central hollow portion of the conductor 2 and out of the outlet channel 11.

I have found that with the foregoing arrangement, it is possible to produce a relatively high temperature, high frequency electrical discharge in the form of an elongated flame-like column 12 extending outwardly along an extended axis of conductor 2 and avoiding thermal contact with conductor 3. Moreover, since the major part of the thermally active portions of the column occurs at a substantial distance from the tip of conductor 2, heating of the latter is minimized. These results occur when the concentric transmission line 1 is energized at a suitable power level at a relatively ultra high frequency (e. g. 1000 megacycles) and the gas is caused to flow through the interspace between the concentric cylinders at a suitable rate of flow. The flame-like arc column will be found to maintain a relatively stable position along the extended axis of conductor 2. The temperature of the parts of line 1 will remain relatively low and, consequently, there is substantially no danger of metallic particles of material from the conductors 2 and 3 becoming detached therefrom and flowing into the arc to contaminate the same. Contamination may be further minimized by making the tip of conductor 2 of a relatively inert metal, such as tungsten. Thereby a relatively clean, uncontaminated discharge is obtained which understandably will be a very desirable feature for many uses of the device wherein it is desired to preclude the possibility of contamination of the article to be heated.

The stability of the position of the discharge at point 12 may be further enhanced by the provision of a focusing gaseous stream which flows concentrically with the main gaseous flow from the orifice 6. For example, I have illustrated such a means as the gaseous flow channel formed by the cylindrical collar 13 about the nose portion of the outer conductor 3 and providing an annular orifice thereabout. By forcing a flow of air or like gas through a channel 14 by suitable means 15, such as a blower or pressure source, it will be possible to form a focusing column of gas flowing concentrically about the discharge and thus enhance its stability.

Among the advantages of the foregoing device by comparison with prior art devices is the fact that the useful heated portion of the discharge is substantially separated from the terminals of the concentric transmission line. Prior art devices normally require metallic conductive electrodes in close proximity to the thermally active portion of the heating arc. Moreover, the above device not only permits the discharge to be substantially separated from the energizing terminals but also permits the use of non-conductive terminals because of the high frequency used. Thus, I have shown in Fig. 2 a modification wherein the active portions of the concentric line are made of insulating material rather than conducting metal. In Fig. 2, the inner conductor 2 is shown as provided with an insulating tip 16 of quartz, glass or like material, while the outer electrode is provided with a similar insulating member in the form of the insulating bushing 17 of quartz, glass or like insulating materials. It may be desirable under certain circumstances to provide the device with insulating terminal surfaces of this nature in order further to minimize any contaminating effects of the metallic structures on the discharge or for similar purposes.

I have found that the foregoing device may be used to generate extremely hot flame-like discharges if certain gases having polyatomic molecules or high ionization potentials be used. For example, I have found that what may be one of the hottest forms of discharge can be formed with ordinary air or nitrogen or oxygen. In the first two cases, there is apparently a disassociation of the nitrogen in the manner already stated. Similarly, I have found it possible to obtain relatively hot discharges even with monotomic gases wherein, of course, the molecular disassociation phenomena cannot occur. Thus, I have obtained relatively hot arcs with helium.

While I have shown and described particular embodiments of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. A heating instrument comprising a concentric transmission line having inner and outer cylindrical members, means for causing a gaseous flow between said members, means for imposing a high frequency potential between said members to establish a high frequency electrodeless discharge in said gaseous flow away from said cylindrical members, said frequency being of the order of one thousand megacycles, the outer of said members including an orifice for directing said flow into a flame-like column outside of said transmission line, said gaseous flow being of sufficient velocity to cause the thermally active portion of said discharge to form as a flame-like column extending away from said orifice in the direction of said flow.

2. A heating instrument comprising a concentric transmission line having inner and outer cylindrical members, means for causing a gaseous flow between said members, means for imposing a high frequency potential between said members to establish a high frequency electrodeless discharge in said gaseous flow away from said cylindrical members, the outer of said members including an orifice for directing said flow into a flame-like stream outside of said transmission line, said gaseous flow being of sufficient velocity to cause the thermally active portion of said discharge to form as a flame-like column extending away from said orifice in the direction of said flow.

3. A heating instrument comprising a concentric transmission line having inner and outer cylindrical members, means for causing a gaseous flow between said members, means for imposing a high frequency potential between said members to establish a high frequency electrodeless discharge in said gaseous flow away from said cylindrical members, the outer of said members including an orifice for directing said flow into a flame-like stream outside of said line, insulating means covering said cylindrical members in the vicinity of said orifice whereby contamination of said discharge is substantially eliminated, said gaseous flow being of sufficient velocity to cause the thermally active portion of said discharge to form as a flame-like column extending away from said orifice in the direction of said flow.

4. A heating instrument comprising a concentric transmission line having inner and outer cylindrical members, means for causing a gaseous flow between said members, means for imposing a high frequency potential between said members to establish a high frequency electrodeless discharge in said gaseous flow away from said cylindrical members, the outer of said members including an orifice for directing said flow into a flame-like stream outside of said line, quartz insulating means covering parts of said cylindrical members exposed to the heat of said discharge whereby contamination of said discharge is substantially eliminated, said gaseous flow being of sufficient velocity to cause the thermally active portion of said discharge to form as a flame-like column extending away from said orifice in the direction of said flow.

JOHN PAUL JORDAN.

REFERENCES CITED

The following references are of record in the file of this patent:

UNITED STATES PATENTS

| Number | Name | Date |
| --- | --- | --- |
| 1,570,803 | Walker | Jan. 26, 1926 |
| 1,854,475 | Littlefield | Apr. 19, 1932 |
| 1,947,267 | Langmuir | Feb. 13, 1934 |
| 2,052,796 | Rava | Sept. 1, 1936 |
| 2,060,842 | Yaglou | Nov. 17, 1936 |
| 2,095,651 | Ronzi | Oct. 12, 1937 |
| 2,127,229 | McRae | Aug. 16, 1938 |
| 2,215,108 | Nigra | Sept. 17, 1940 |

FOREIGN PATENTS

| Number | Country | Date |
| --- | --- | --- |
| 128,301 | Austria | May 25, 1932 |
| 149,535 | Austria | May 10, 1937 |
| 544,326 | Great Britain | Apr. 8, 1942 |

OTHER REFERENCES

"GE Welding Arcs," vol. 12, No. 2, July 1946, page 10. Apparatus Department, General Electric Co., Schenectady 5, N. Y.